Oct. 10, 1933.  C. D. KNOWLTON  1,929,533
CONNECTING DEVICE
Filed May 13, 1930
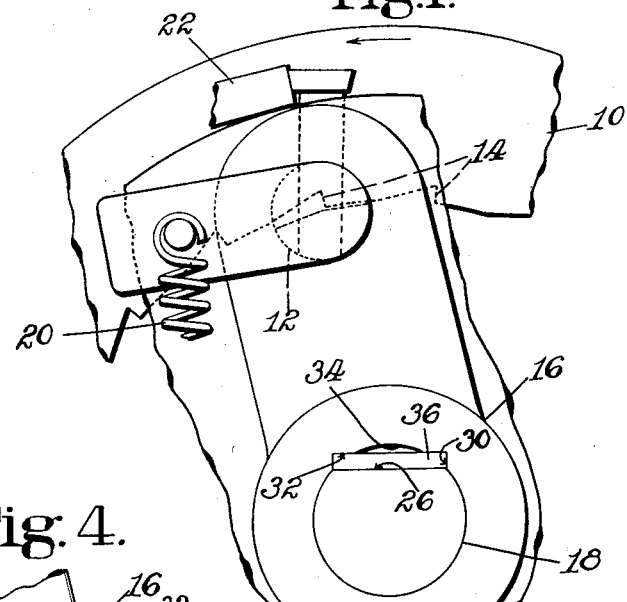
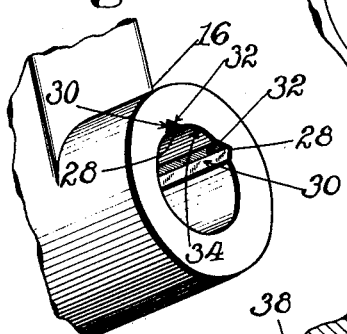
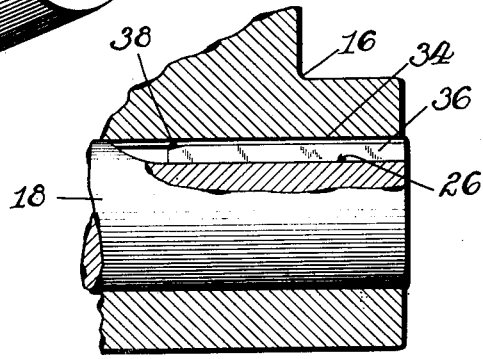
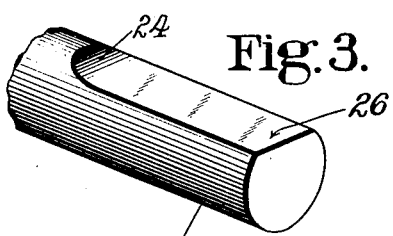
INVENTOR
Cutler D. Knowlton
By his Attorney,
Nelson W. Howard Patented Oct. 10, 1933

1,929,533

UNITED STATES PATENT OFFICE 1,929,533

CONNECTING DEVICE

Cutler D. Knowlton, Beverly, Mass., assignor to Hoague-Sprague Corporation, Lynn, Mass., a corporation of Massachusetts Application May 13, 1930. Serial No. 451,943

3 Claims. (Cl. 287—52.05)

This invention relates to connecting devices. It finds a particularly useful place in joining to each other such elements as a shaft and a surrounding member, for example a pulley or a portion of a clutch.

An object of the invention is to so securely hold such connected rotatable members that their tendency to work loose under shocks produced by starting, stopping and other changes of load, will be minimized, the means to effect this being simple and readily produced. To attain this object, I provide, in one of the inner and outer members which are to be joined, preferably the inner, a depression, and in the other or outer member depressions shown as angular and separated by an intermediate arcuate portion of substantial peripheral extent. Into engagement with the walls of the depressions a unitary securing member or key is adapted to be forced, the arcuate portion providing a space separating the opposed surfaces of the securing member and of the outer member from each other. By such a construction the resistance to the rotative stresses is distributed over surfaces between which a perfect bearing may readily be obtained and which are of such limited areas that the seating force required for the securing member is not excessive, the central fulcrum surface over which rocking and resultant pounding might occur being entirely omitted. At the same time, the manufacturing steps involved in making the connection are relatively inexpensive, and the stable mounting of the outer member upon an arbor for operations upon it is not interferred with.

In the accompanying drawing,

Fig. 1 shows one embodiment of my connecting device associated with portions of a clutch and a driven shaft;

Fig. 2 is a partial vertical, axial section; and

Figs. 3, 4 and 5 show, respectively, in perspective the co-operating portions of the shaft, the surrounding member and the connecting key separated from one another.

At 10 appears a driving member of a clutch of the rotary-key type, this key 12, for engagement with teeth 14 of the driving member, being arranged to turn in a driven clutch member 16 carried by a shaft 18, to which power is controllably applied through the clutch. The clutch-key is turned to engage the teeth, and thus cause rotation of the shaft, by a spring 20, and is disengaged to free the shaft by a stop 22, which may be moved into the path of a portion of the key. Obviously, the shocks imposed upon the means for securing together the shaft 18 and the surrounding clutch member 16 in starting and stopping the rotation of the former are considerable.

To associate with the elements above described my improved connecting device, a flattened portion or depression 24 is formed in the shaft at its end, this depression being preferably segmental. Since the depression extends straight across the shaft, furnishing a plane surface 26 thereon parallel to the axis of rotation, it may readily be ground and therefore produced in hardened material which would be difficult to mill. In the bore through the hub of the clutch member 16 which receives the shaft are two V-shaped or angular depressions 28 having a length at least equal to the shaft-depression 24, and so spaced from each other circumferentially of the bore that their walls 30 substantially register, respectively, with the opposite edges of the shaft-surface 26. Between walls 32 of the depressions 28, which lie at right angles to the walls 30 and parallel to the shaft-wall 26, there is an unbroken arc 34 of the clutch-bore of substantial peripheral extent, the opposite wall furnishing an arc of greater extent. To connect the shaft and clutch member, I furnish a key 36, rectangular in cross-section, having such a width as to leave some clearance between it and the walls 30, 30, and a thickness giving it a driving fit between the walls 26 and 32, 32. The central portion of the key is separated from the arcuate wall 34 of the clutch-bore. In length, the key may extend substantially through the depressions 24 and 28, leaving only a suitable clearance at the inner end. An inclined surface 38 upon the inner extremity of the key facilitates its introduction into the depressions.

In assembling the elements, the outer member 16 is placed about the shaft 18 with the depressions 28, 28 opposite the ends of the depression 24. Then the key is inserted and forced into place. It will be seen that, because of the separation between the hub-surfaces 32, 32 and their relatively limited lateral dimensions, the contacting surface of the key may readily be caused to conform to them, a thing which would be difficult were engagement with the hub sought over the entire opposing surface of the key. As a result of this complete contact, the relation is a stable one, not likely to be disturbed by driving forces even when changes are sudden and extreme. These forces are received upon the surfaces 32, 32 considerably removed from the radius which bisects the key, at which point the resistance offered by the contact between the key and hub and opposing relative rotation would be a minimum, and thus the advantage of a considerable resisting leverage obtained. To put this in another way, there being no contact between the central area of the key and the arcuate surface 34 of the hub, the fulcrum about which variations in the driving or resisting forces might cause a rocking action to be set up is absent, and the tendency of the connection to work loose is greatly reduced. At the same time, the limited area of contact between the key and hub lessens the force required to seat the former and consequently reduces the danger of bursting the hub. When the outer member is to be applied to an arbor, the arcuate wall 34 contacting therewith gives more perfect engagement than would be the case were this portion of the hub cut away. The single key presents an extended bearing area to the shaft, has a large end which does not break down in driving, and is easy to handle. The cost of producing the key and the depressions which receive it is small.

Having described my invention, what I claim as new and desire to secure by Letters Patent of the United States is:

1. The combination with inner and outer rotatable members, one being provided with a depression and the other with depressions separated by an intermediate arcuate portion of substantial peripheral extent, said depressions and arcuate portion extending along the opposed surfaces of the members substantially parallel to the axis of rotation, of a unitary securing member adapted to be forced into engagement with the walls of the depressions, the arcuate portion providing a space separating the opposed surfaces of the securing member and the outer member from each other.

2. The combination with a shaft provided with a segmental depression and a member having an opening to receive the shaft and depressions separated by arcuate walls of the shaft-receiving opening in both directions circumferentially of said opening, of a key consisting of a unitary member having a driving fit in the depressions of both the shaft and member and securing the two together, the outer face of said key between the depressions in the member being spaced from the opposed arcuate wall.

3. In combination, a member provided with a bore in the cylindrical wall of which are two V-depressions spaced from each other by arcuate walls of unequal extent, a shaft lying within the opening and having upon its periphery a plane surface opposite the arcuate wall of lesser extent and with its longitudinal edges substantially registering with the walls of the V-depressions in the member, and a key entering said V-depressions and contacting with the plane surface of the shaft, said key being spaced from the lesser arcuate wall of the bore.

CUTLER D. KNOWLTON.